Oct. 28, 1941.   K. G. HEFT ET AL   2,260,747
METHOD AND APPARATUS FOR FORMING PRINTS OF BUTTER OR THE LIKE
Filed May 2, 1938   3 Sheets-Sheet 3
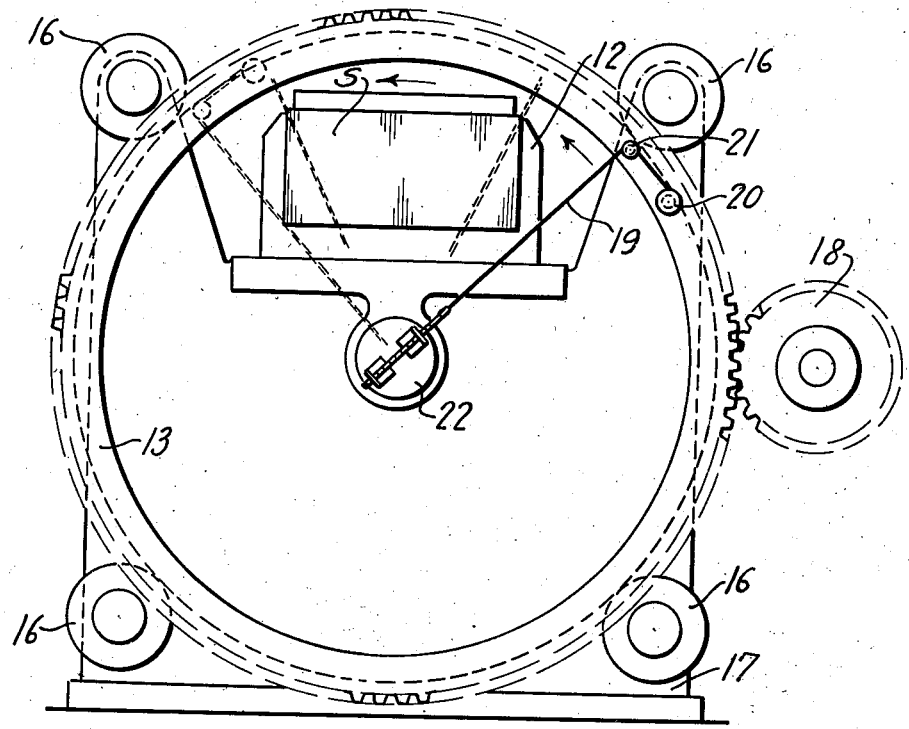
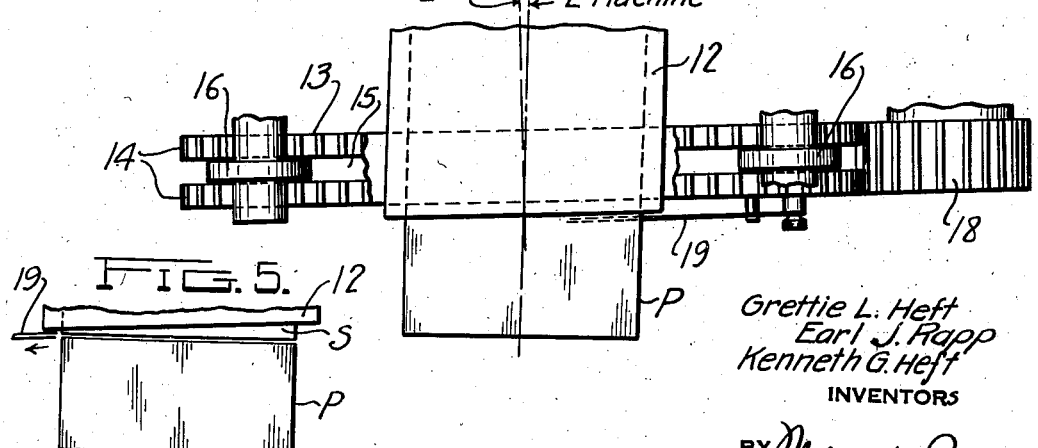
Grettie L. Heft
Earl J. Rapp
Kenneth G. Heft
INVENTORS
BY
ATTORNEY Patented Oct. 28, 1941

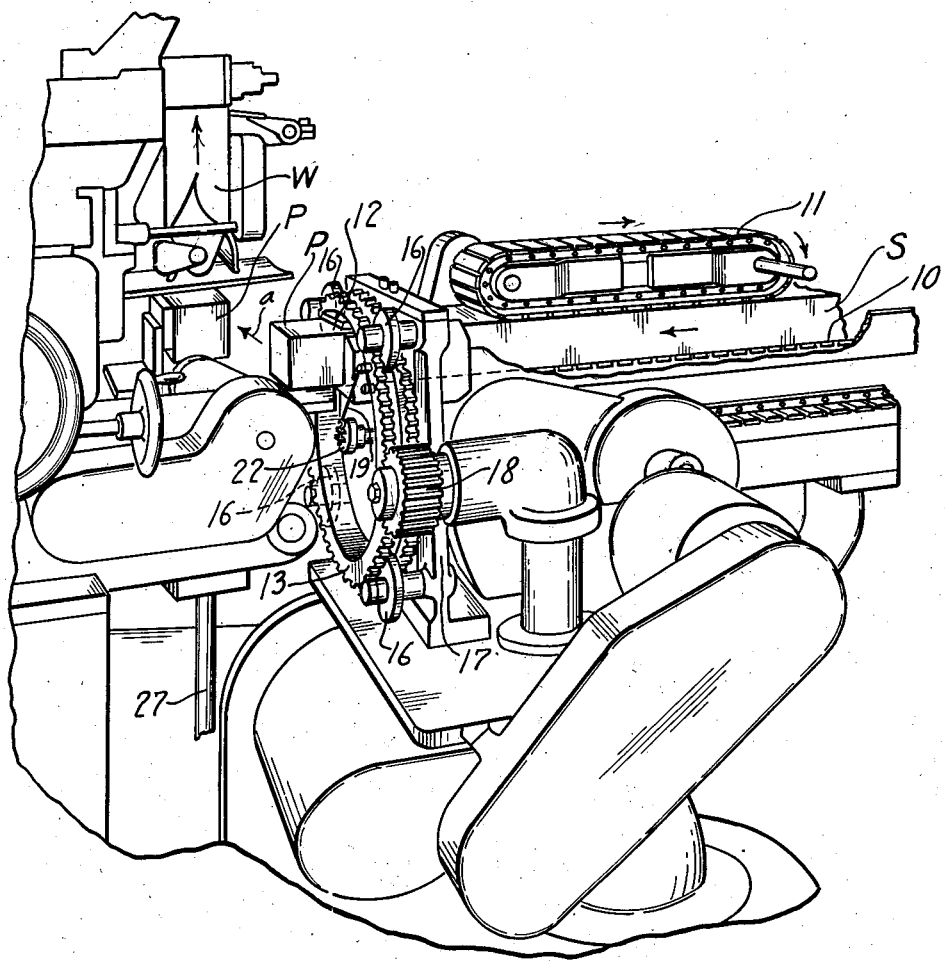

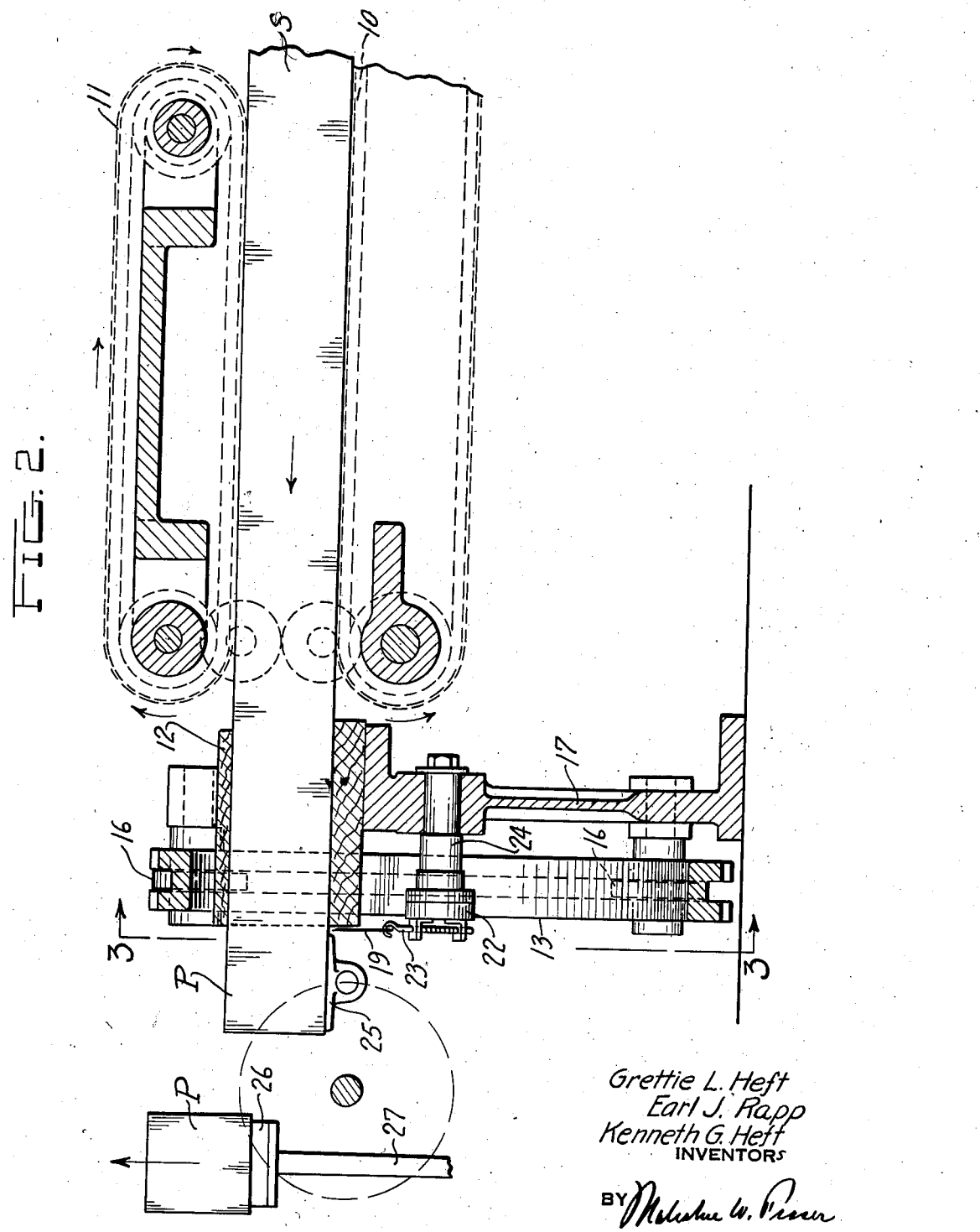

2,260,747

UNITED STATES PATENT OFFICE 2,260,747

METHOD AND APPARATUS FOR FORMING PRINTS OF BUTTER OR THE LIKE

Kenneth G. Heft, Grettie L. Heft, and Earl J. Rapp, Toledo, Ohio, assignors to Morris Packaging Equipment Company, Toledo, Ohio, a corporation of Ohio Application May 2, 1938, Serial No. 205,540

11 Claims. (Cl. 31—20)

This invention relates to the cutting of prints or bars of butter, lard, oleomargarine or the like from a continuous slab but more particularly to the continuous forming of bars or prints of a predetermined size or weight.

An object of the invention is to produce a new and improved method and apparatus for recurrently severing or cutting a continuously advancing slab of material such as butter or oleomargarine in such manner that a substantially square cut is effected and by a cutting instrumentality which progressively severs the slab substantially without translatory movement in the direction of the slab advancing movement.

Another object is to produce a method and apparatus for severing a print from an elongate slab by causing a cutting instrument to pass through the advancing slab obliquely and in timed relation to the slab movement, the angular movement of the cutting instrument and the slab movement being so timed that a substantially square cut is effected.

A still further object of the invention is to produce a method and apparatus for cutting an elongate slab by a revolving wire which revolves about an axis obliquely disposed relative to the longitudinal axis of the slab, the parts operating in such manner that the cutting wire, after progressively passing through the slab, leaves it at a point directly opposed to the entering point so that a substantially square cut is obtained.

Other objects and advantages of the invention will hereinafter appear and for purposes of illustration, an embodiment of the invention is shown on the accompanying drawings in which Figure 1 is a perspective view of a portion of a machine for severing prints from an elongate slab and advancing the severed prints to a wrapping unit;

Figure 2 is an enlarged vertical sectional elevation of the slab feeding device and the cutting ring;

Figure 3 is an end view of the cutting ring substantially on the line 3—3 of Figure 2;

Figure 4 is a plan view of the cutting ring, a portion of which is broken away showing somewhat exaggerated the axis of the cutting ring and the longitudinal center of the slab guide; and Figure 5 is a diagrammatic plan view illustrating the manner in which the slab is cut by the cutting wire.

The illustrated embodiment of the invention comprises a machine for advancing an elongate slab S of a plastic or semi-plastic material such as butter, oleomargarine, lard or the like, it being desired recurrently to sever from the slab S bars or prints P of a predetermined size as, for example, one pound, one-half or one-quarter pound prints. The slab S is first formed into a substantially rectangular shape and is delivered to a suitable endless conveyor 10 with which a vertically spaced endless conveyor 11 cooperates, the latter engaging the upper side of the slab S and assisting in the advancing movement. The detail construction and operation of the conveyors 10 and 11 form no part of the present invention so that detail description is not considered necessary. Suffice it to say that conveyors of this character are usually made up of an endless series of wooden bars or slats to which material such as butter does not readily adhere. The conveyors 10 and 11 are preferably continuously driven in order to advance the slab S at a predetermined normal rate of speed but, for a purpose which will hereinafter appear, the normal speed of the slab is recurrently reduced for a period of time sufficient to enable severance of the slab to be accomplished, whereupon the slab resumes its normal rate of speed until the next succeeding cutting operation. Any suitable mechanism may be employed to effect such movement of the slab S and since such mechanism is old and well-known in the art, detail description thereof is not given.

In advance of the conveyors 10 and 11 is a box or guide 12 which is open-ended and snugly embraces the slab on four sides during its movement therethrough, which sides are preferably of wood such as maple.

Arranged directly in advance of the guide housing 12 is a ring 13 in the form of an annulus having two annular rolls of gear teeth 14 between which is an annular groove 15. Supporting the ring 13 and restraining it from axial or translatory movement are four wheels or discs 16 carried by a rectangular frame 17 suitably secured to the main frame of the machine. The ring or annulus 13 is driven by a pinion 18 engaging both sets of teeth 14 and the pinion is driven in any suitable manner in timed relation to the advancing movement of the slab S. An important feature of the invention resides in disposing the axis of the ring or annulus 13 at an oblique angle or an acute angle to the longitudinal center or axis of the slab S and the purpose thereof will hereinafter appear.

Moving with the ring 13 is a cutting instrument in the form of a wire 19 one end of which is anchored to a post 20 on the outer side of the ring, the wire passing over a guide post 21 and thence extending radially of the ring to a head 22, engaging the hooked end of a stem 23 which is in screw-threaded engagement with ears extending outwardly from the head. The head 22 is connected to a post 24 which is rotatably mounted on the frame 17. As the ring 13 rotates, the cutting wire 19 revolves with it, the head 22 rotating during such movement.

As particularly shown on Figures 4 and 5 (the showing in Figure 4 being exaggerated more clearly to illustrate the feature), the cutting wire 19 during the rotation of the ring 13 engages the lower right-hand edge of the slab and then progressively cuts through the slab to form the print P and in view of the oblique arrangement of the cutting wire, relative to the longitudinal axis of the slab S, moving in an inclined forward direction relative to the slab movement, the point at which the cutting wire leaves the slab is directly opposed to the point at which the cutting wire initially engaged the slab. The line of severance is at substantially right angles to the axis or longitudinal center of the slab by moving the cutting wire 19 in an angular direction as above described and properly timing the advance movement of the slab S.

As above mentioned, the slab S recurrently moves at a reduced speed and it is during such movement that the cutting operation takes place. It will be obvious that the angle of inclination of the cutting wire is so proportioned to the slab movement that the slab will have advanced exactly a distance equal to the space between the forward end of the cutting wire and an imaginary line from the rear end of the wire and extending across the slab substantially at right angles to the direction of slab movement. The print P represented on the drawings indicates a one pound size but one-half and one-quarter pound prints can be cut by changing the relative operation of the parts. It will also be manifest that slowing down the movement of the slab S under some circumstances will not be necessary and the prints may be cut from the slab during the forward movement of the slab at uniform speed.

It will be observed that that portion of the slab in advance of the housing guide 12 is adapted to rest upon a platen 25 so that when the print P has been severed it is supported by the platen 25. The platen 25 is moved laterally in the direction of the arrow $a$ and is delivered to a plunger head 26 having a rod 27 which reciprocates vertically to advance the print P to suitable wrapping mechanism W for wrapping the print with sheet material, such as parchment paper. Details of the construction and operation of the wrapping mechanism form no part of the present invention so that further description and illustration are not considered necessary.

While we have shown and described one form of our invention which is the best form known to us at the present time, it is to be understood that numerous changes in details of construction, arrangement and operation may be effected without departing from the spirit of the invention especially as defined in the appended claims.

What is claimed is:

1. The method of severing a slab of butter or the like which consists in advancing the slab horizontally, and passing a wire traveling a circular, vertically arranged path progressively through the advancing slab and at an angle inclined toward the slab movement during movement of the wire through a sector of its path.

2. Apparatus for severing a slab of butter or the like comprising means for advancing a slab, and means operable during advancing movement thereof for progressively severing the slab including a radially arranged wire having only revolving movement about a fixed axis and through a plane which is inclined forwardly in the direction of slab movement.

3. Apparatus for severing a slab of butter or the like comprising a guide, means for continuously advancing a slab along said guide, a ring through which said guide extends, a mounting for said ring affording rotary movement thereof but restraining same from axial movement, means for rotating said ring, a cutting wire anchored at one end to said ring, and a rotatable support coaxial of said ring to which the other end of said wire is anchored.

4. Apparatus for severing a slab of butter or the like comprising a guide, means for continuously advancing a slab along said guide, a ring, said guide extending through said ring at one side of the axis thereof, a mounting for said ring affording rotary movement thereof but restraining same from bodily movement in an axial direction, means for continuously rotating said ring, a rotatable support axially of said ring, and a cutting wire secured respectively to said support and ring, said wire being disposed obliquely relative to the longitudinal axis of said guide whereby it progressively severs the slab along a line at approximately right angles to the axis of said guide.

5. Apparatus for severing a slab of butter, or the like, comprising means for advancing the slab, and severing means rotating about a single axis which is angularly arranged with respect to the path of advance of the slab and operable during advancing movement of the slab, said severing means including a cutting instrument passing through the advancing slab in a manner to produce a resultant line of severance which is substantially at right angles to the path of advancement of the slab.

6. Apparatus for severing a slab of butter, or the like, comprising means for advancing the slab, and severing means rotating about a single axis which is obliquely arranged with respect to the path of advancement of the slab and operable during advancing movement of the slab, said severing means including a cutting wire extending radially from said axis and constantly traveling through a single plane to pass through the advancing slab in a manner to produce a resultant line of severance which is substantially at right angles to the path of advancement of the slab.

7. Apparatus for severing a slab of butter, or the like, comprising means for advancing the slab, and severing means operable during advancement of the slab and including a rotatable annulus, a separate, rotatable post, said annulus and post rotating about a common axis which is angularly arranged with respect to the path of advancement of the slab, and a cutting wire stretched between the annulus and the post; and means for rotating the severing means in such timed relation to the advancement of the slab as to produce a resultant line of severance which is substantially at right angles to the path of advancement of the slab.

8. Apparatus for severing a slab of butter, or the like, comprising slab cutting means including a rotatable annulus, a rotatable post coaxially arranged with respect to the annulus, a cutting wire stretched from the post to the annulus, means for advancing the slab through a path which is angularly arranged with respect to the common axis of said annulus and post, and means for driving the cutting means and the slab advancing means in such timed relation that the cutting wire will pass through the advancing slab in a manner to produce a resultant line of severance which is substantially at right angles to the path of advancement of the slab.

9. Apparatus for severing a slab of butter, or the like, comprising slab cutting means including a rotatable annulus, a rotatable post coaxially arranged with respect to the annulus, and a cutting wire stretched from the post to the annulus; means for advancing the slab through a path which is angularly arranged with respect to the common axis of said annulus and the post, and means for driving the cutting means and the slab advancing means in such timed relation during cutting operations that the cutting wire will pass through the advancing slab in a manner to produce a resultant line of severance which is substantially at right angles to the path of advancement of the slab and for driving the slab advancing means between cutting operations at an increased rate of speed.

10. A method of advancing a slab of butter, or the like, comprising advancing a slab through a straight path, and cutting the slab during its advancement by a wire which travels continuously in a single, truly vertically arranged plane that obliquely intersects the path of advancement of the slab.

11. Apparatus for severing a slab of butter, or the like, comprising means for advancing a slab through a straight path, a cutting wire, and means for continuously moving the cutting wire through a single, truly vertically arranged plane that obliquely intersects the path of advancement of the slab.

KENNETH G. HEFT.
GRETTIE L. HEFT.
EARL J. RAPP.